Feb. 21, 1950 D. T. BALPH 2,498,478
APPARATUS FOR DRYING FABRICS OR THE LIKE
Filed March 12, 1947

WITNESSES:
Rg. Riegr
V. W. Novak

INVENTOR
DALE T. BALPH
BY
ATTORNEY

Patented Feb. 21, 1950

2,498,478

UNITED STATES PATENT OFFICE 2,498,478

APPARATUS FOR DRYING FABRICS OR THE LIKE

Dale T. Balph, Lexington, Ohio, assignor to Westinghouse Electric Corporation, East Pittsburgh, Pa., a corporation of Pennsylvania Application March 12, 1947, Serial No. 734,018

1 Claim. (Cl. 34—68)

My invention relates to apparatus for drying fabrics or the like and has for an object to provide improved apparatus of this kind.

A further object of the invention is to effect, in a drier of the type set forth, drying of the material with or without tumbling depending upon the character of the material being treated.

A further object of the invention is to provide an improved domestic drier of the type set forth having a primary drying chamber wherein tumbling of the fabrics accompanies drying and a second chamber wherein drying of the fabrics is carried out without tumbling.

These and other objects are effected by my invention as will be apparent from the following description and claim taken in connection with the accompanying drawing, forming a part of this application, in which:

Figure 3:
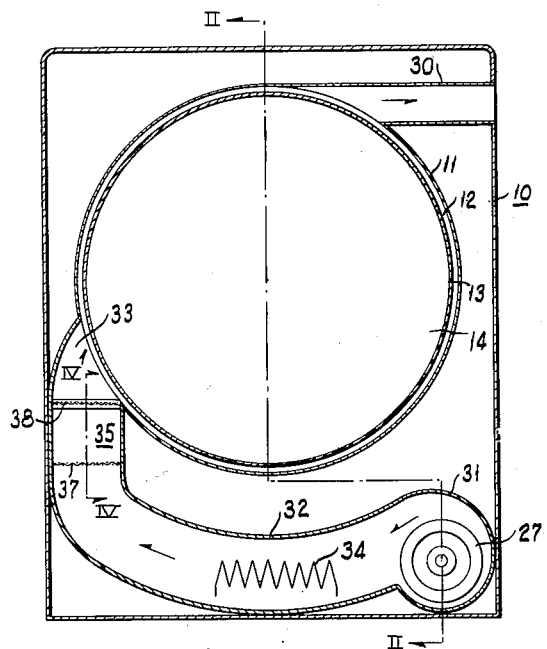
Figs. 2 and 3 are, respectively, sectional views taken along the lines II—II and III—III of Figs. 3 and 2.

Referring now to the drawing, I have shown my invention applied to a domestic clothes drying machine of the type having an outer casing structure 10 which encloses a generally cylindrical baffle 11, the latter extending from the front to the rear wall of the casing 10 and defining a primary drying chamber 12 therein. Arranged within the drying chamber 12 is a rotatable basket 13, the side wall 14 of which is perforate, a few of the perforations being indicated at 15. The basket is carried by a stub shaft 16 suitably supported in a bearing 17, the latter being supported in any well-understood manner by the back wall of the casing 10. Rotation of the basket 13 is effected in any well-understood manner, such as, for example, by a pulley 18 belted, as shown at 19, to a pulley 21 driven by a conventional electric motor 22.

The front wall of the casing 10 which I have indicated at 23 is provided with an access opening 24 for the ingress and egress of the material to be dried. A chute structure 25 may be employed for conveying said material from the access opening 24 to the interior of the basket 13. A door 26, hinged in any well-understood manner to the front wall 23, is provided for closing the access opening 24.

Figure 2:
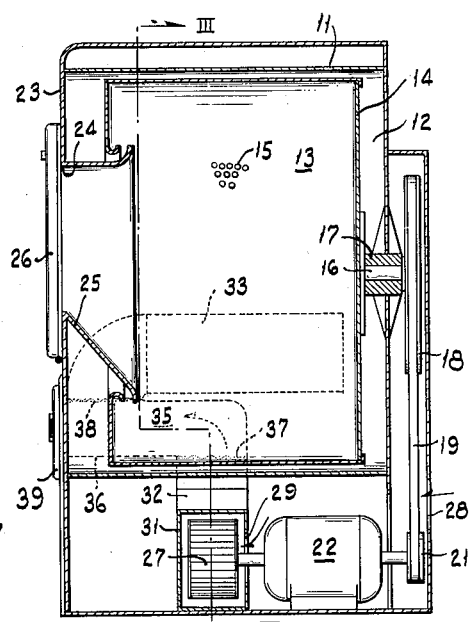
Figures 1, 4:
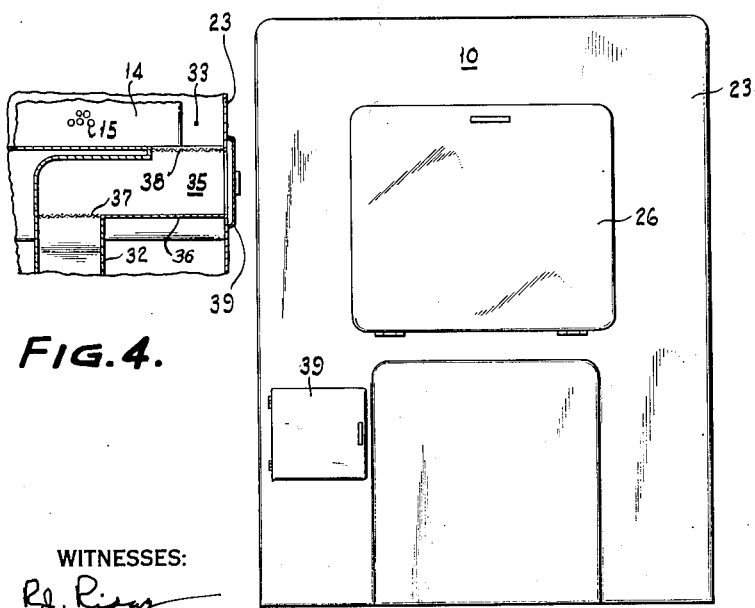
Fig. 1 is a front view of a domestic drier constructed and arranged in accordance with my invention.
Fig. 4 is a sectional view taken along the line IV—IV of Fig. 3.

Air is translated through the drying chamber 12 and the interior of the basket 13 by a fan, generally indicated at 27, and driven by the electric motor 22. Air from the ambient atmosphere passes through a suitable opening 28 formed in the back wall of the casing 10, as shown in Figure 2, and then passes to the fan 27 through an inlet opening 29 formed in the fan casing 31. Air translated by the fan 27 passes through a duct 32 extending transversely of the casing 10, as shown in Figure 3, and thence to the drying chamber 12 through a relatively large opening 33 formed in the baffle 11. Prior to its delivery to the drying chamber 12, the air is heated in any well-understood manner, such as, for example, by means of an electric heater 34 arranged in the duct 32. The heater 34 is diagrammatically shown and will not be described in detail since the heater per se forms no part of the present invention. The heated air after abstracting moisture from the material being dried is discharged to the ambient atmosphere through a discharge duct 30.

In the operation of a drier described up to now, fabrics to be dried are deposited in the basket 13 after which the motor 22 and the electric heater 34 are energized. The former operates to rotate the basket 13 at a relatively low speed of, for example, 50 R. P. M., to tumble the fabrics and the fan 27 functions to translate air heated by the heater 34 through the drying chamber in contact with the fabrics being dried. Moisture is, therefore, evaporated from the fabrics and conveyed to the ambient atmosphere through the discharge duct 30.

Frequently, there are articles to be dried in a domestic drier which should not be tumbled. For example, it is frequently necessary to dry gloves which are drawn on a form for drying, and other articles, such as, canvas shoes. In accordance with my invention, the drier structure is provided with a separate or secondary drying chamber which I have indicated at 35 and which is interposed in the duct structure 32 intermediate the heater 34 and the opening 33. Accordingly, all heated air which is translated to the drying chamber 12 traverses the secondary drying compartment 35. The drying compartment 35 is defined by an open-end box structure 36 having respective air inlet and outlet openings 37 and 38. The inlet and outlet openings 37 and 38 are provided with gratings which permit the passage of air therethrough and prevent any article deposited in the compartment 35 from dropping into the duct structure 32. The open front end of the compartment 35 is closed by a suitable door 39 which may be hinged in any well-understood manner to the front wall 23.

From the foregoing description, it will be apparent that I have provided an improved domestic drier for fabrics or the like wherein fabrics may be dried in the usual manner, accompanied by tumbling, and wherein a second compartment is provided for drying articles which should not be tumbled during the drying operation. The air translated through the drier structure passes through both chambers during all operating periods so that both compartments may be utilized simultaneously or selectively.

While I have shown my invention in but one form, it will be obvious to those skilled in the art that it is not so limited, but is susceptible of various changes and modifications without departing from the spirit thereof.

What I claim is:

In apparatus for drying fabrics or the like, the combination of a housing including a front wall having first and second access openings formed therein, means defining a drying chamber within the housing and communicating with said first access opening, a basket for containing the fabrics to be treated and disposed within said drying chamber, means rotatably supporting the basket, a motor, means driven by the motor for actuating said basket angularly about its axis for tumbling the fabrics, a duct disposed beneath the drying chamber and extending transversely within the housing for conveying air to the drying chamber, a fan arranged at one end of the duct and actuated by said motor for translating air through the duct, a heater arranged within the duct for heating the air, means defining a drying compartment within the housing and communicating with said second access opening, said drying compartment being disposed at least in part beneath a portion of the drying chamber and communicating with said duct intermediate the heating means and said drying chamber and first and second doors for respectively closing the first and second access openings.

DALE T. BALPH.

REFERENCES CITED

The following references are of record in the file of this patent:

UNITED STATES PATENTS

| Number | Name | Date |
|---|---|---|
| 1,602,700 | Noun | Oct. 12, 1926 |
| 2,271,757 | Boltz | Feb. 3, 1942 |
| 2,310,680 | Dinley | Feb. 9, 1943 |
| 2,351,429 | Huebsch | June 13, 1944 |